(12) United States Patent
Jepsen et al.

(10) Patent No.: US 8,187,364 B2
(45) Date of Patent: May 29, 2012

(54) METHOD AND APPARATUS FOR REMOVING VOLATILE CONTAMINANTS FROM INDUSTRIAL PLANTS

(75) Inventors: Ove Lars Jepsen, Emmaus, PA (US); Peter T. Paone, III, Bethlehem, PA (US); John S. Salmento, Nazareth, PA (US)

(73) Assignee: FLSmidth A/S (DK)

( * ) Notice: Subject to any disclaimer, the term of this patent is extended or adjusted under 35 U.S.C. 154(b) by 469 days.

(21) Appl. No.: 12/583,274

(22) Filed: Aug. 18, 2009

(65) Prior Publication Data

US 2011/0041690 A1 Feb. 24, 2011

(51) Int. Cl.
*B01D 53/02* (2006.01)

(52) U.S. Cl. .................. 95/132; 95/90; 95/107; 95/133; 95/134; 95/148; 55/423; 110/203; 110/345; 423/210

(58) Field of Classification Search ............... 95/90, 107, 95/132, 133, 134, 148; 55/423; 110/203, 110/345; 423/210
See application file for complete search history.

(56) References Cited

U.S. PATENT DOCUMENTS

| | | | | | |
|---|---|---|---|---|---|
| 2,627,452 | A | * | 2/1953 | Cunningham | 423/191 |
| 3,451,665 | A | * | 6/1969 | Strassen | 106/747 |
| 3,786,135 | A | * | 1/1974 | Kloap et al. | 423/496 |
| 4,889,698 | A | * | 12/1989 | Moller et al. | 423/210 |
| 5,264,013 | A | * | 11/1993 | Brentrup | 95/128 |
| 5,538,537 | A | * | 7/1996 | Schmidt et al. | 95/107 |
| 5,556,447 | A | * | 9/1996 | Srinivasachar et al. | 75/670 |
| 5,951,279 | A | * | 9/1999 | Hunold et al. | 432/106 |
| 6,719,828 | B1 | * | 4/2004 | Lovell et al. | 95/134 |
| 6,855,302 | B2 | * | 2/2005 | Eckert et al. | 423/210 |
| 7,520,994 | B2 | * | 4/2009 | Dong et al. | 210/661 |
| 7,794,524 | B2 | * | 9/2010 | Jepsen et al. | 95/107 |
| 2003/0047440 | A1 | * | 3/2003 | Granite et al. | 204/157.4 |
| 2003/0104937 | A1 | * | 6/2003 | Sinha | 502/400 |
| 2003/0206843 | A1 | * | 11/2003 | Nelson, Jr. | 423/210 |
| 2004/0040441 | A1 | * | 3/2004 | Skaarup Jensen et al. | 95/116 |
| 2005/0075236 | A1 | * | 4/2005 | Ramme et al. | 502/38 |

* cited by examiner

*Primary Examiner* — Robert J Hill, Jr.
*Assistant Examiner* — Christopher P Jones
(74) *Attorney, Agent, or Firm* — Daniel DeJoseph; Aaron M. Pile; Jeffrey A. Sharp

(57) ABSTRACT

A method and apparatus for simultaneously removing alkali chlorides from an industrial process and purifying vaporizable contaminants such as mercury from a particulate material. Gases containing alkali chlorides are cooled to a temperature above the boiling point of the contaminants and below the boiling point of the alkali chlorides. Particulates rich in alkali chlorides are removed from the gas stream with a first dust collector. The gas stream cleaned of alkali chlorides is directed to a reaction area where particulate material containing mercury contaminants is inserted into the gas stream to vaporize the contaminants from the material and entrain the cleaned material in the gases. The gases are directed to a second dust collector to remove the entrained particulate material, after which a sorbent or chemical reagent is injected in the gases to interact with the contaminants and form a contaminant containing product that is entrained in the gases and thereafter separated from the gases.

20 Claims, 3 Drawing Sheets

METHOD AND APPARATUS FOR REMOVING VOLATILE CONTAMINANTS FROM INDUSTRIAL PLANTS

BACKGROUND OF THE INVENTION

There is an increasing level of awareness concerning the emission of mercury and other contaminants from industrial plants such as cement manufacturing plants. Cement plants, for example, have a wide range of mercury inputs and resulting emissions because of the wide variety of raw materials and fuels used in the process. Some cement plants may not only need to reduce mercury emissions but also need to reduce alkali chlorides (which is used herein to mean both alkali chlorides, i.e. sodium chloride and potassium chloride, and sulfur chlorides) in the kiln system to reduce build-up problems in the preheater tower or to lower the alkali chloride content of the clinker to meet product quality standards.

Consequently, there is a need to cost effectively control both mercury emissions and reduce the alkali chlorides in an industrial kiln system, which is the object of the present invention.

BRIEF DESCRIPTION OF THE INVENTION

According to the invention, there is method applicable to an industrial plant utilizing a cement or lime kiln or an industrial boiler for continuously and simultaneously removing alkali chlorides and mercury contaminants. The plant on which the method is advantageously employed will have a high concentration of alkali chlorides and a mercury laden particulate byproduct such as kiln dust or, in the case of an industrial boiler, fly ash. The method generally comprises using a single gas stream to remove the alkali chlorides and to vaporize mercury contaminants. In one embodiment of the present invention, there is a method to continuously remove alkali chlorides and mercury from an industrial plant, in particular a cement plant that only has to process a fraction of the gas stream going to the plant's main stack to thereby reduce capital and operating costs. By providing a continuous alkali chloride and mercury removal, the system reduces (i) the likelihood of preheater buildup problems, (ii) the alkali chloride content of product such as cement clinker, and (iii) the variability of the mercury concentration in the process gas stream. This invention can be used on any industrial processing plant that have volatile metals, VOC's, dioxin/furans or other compounds which have substantially lower boiling points than alkali chlorides and which recirculate within the industrial processing plant, and for example can be used in conjunction with long dry cement kilns, long wet cement kilns, lime kilns and a power plant's coal fired boiler.

Figure 1:
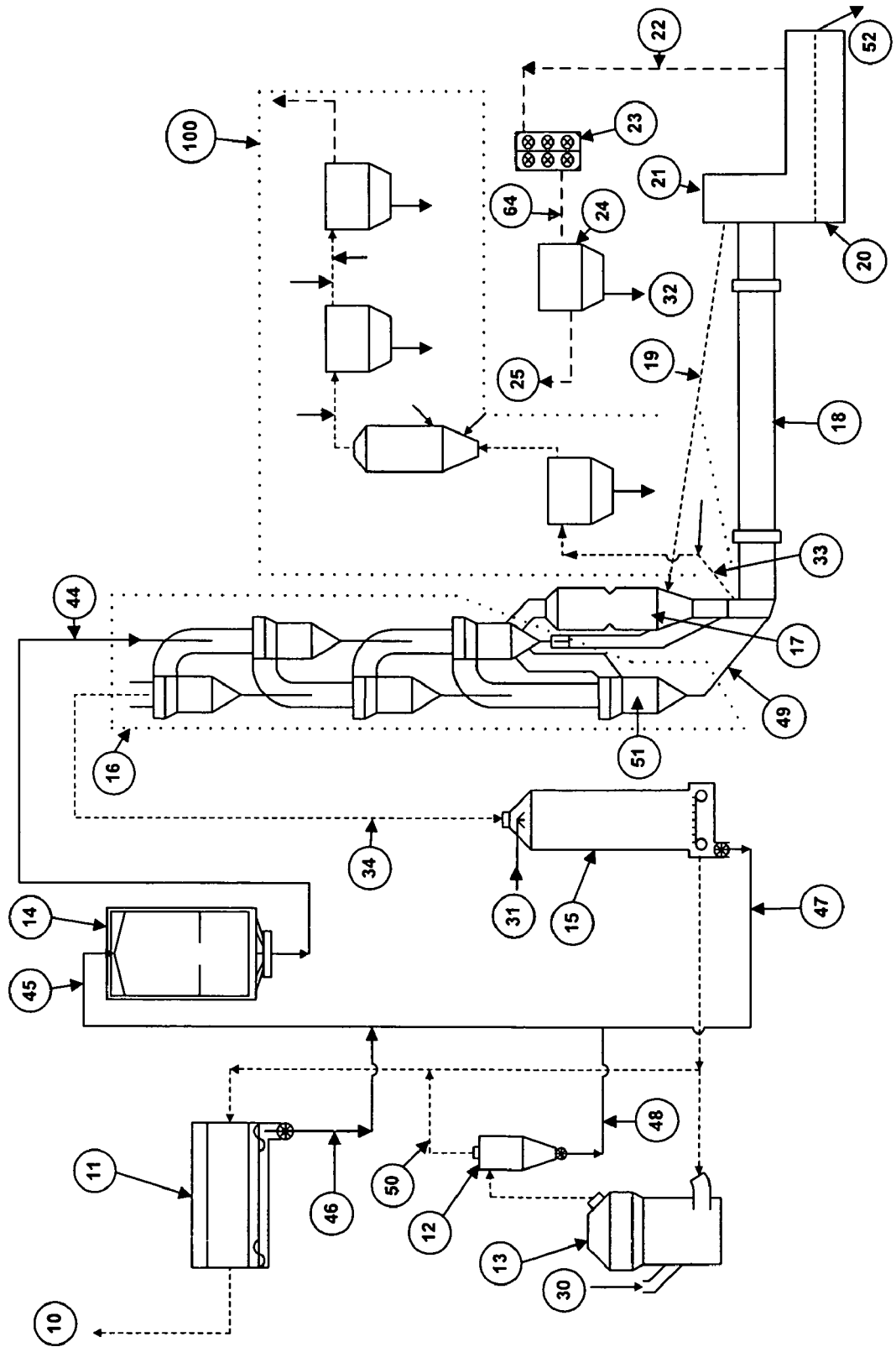
FIG. 1 is a general diagram of a plant for the production of cement clinker adapted to the continuous cleaning of particulate material of mercury and other contaminants while simultaneously removing alkali chlorides.

The drawings are not necessarily drawn to scale.

DESCRIPTION OF THE INVENTION

Although the invention is particularly directed to the simultaneous removal of alkali chlorides and mercury contaminants it should be understood that the present invention also applies to the removal of other volatilized materials such as volatile metals, VOC's and dioxin/furans that contaminate manufacturing processes.

Alkali chlorides enter an industrial plant such as a cement plant via the raw materials and fuel. In a cement plant, the concentrations of alkali chlorides in the kiln system can be very high due to re-circulation of the components as most of the alkali chlorides evaporate in the burning zone of the kiln, condense in the preheater tower, and then are transported back to the burning zone with the powder material. This repeated evaporation and condensation causes the alkali chloride concentration to increase to up to fifty times the input concentration. Equilibrium is eventually reached due to the loss of alkali chlorides with the clinker. These high concentrations can cause buildup problems in the preheater tower and/or raise the clinker's alkali chloride content to unacceptable levels.

Mercury typically enters an industrial process, such as a cement kiln process, in raw materials and fuels. In cement processes the mercury enters in very low concentrations. Due to the phase properties of mercury and mercury compounds, very little mercury exits with the cement clinker product. Most of the mercury re-circulates in the process between the raw mill, main kiln filter and the preheater tower. The mercury compounds vaporize in the preheater tower and travel in the gas stream to the raw mill and main kiln filter. When the raw mill is running a high percentage of the mercury in the gas stream is captured by the raw meal. The captured mercury is disproportionably concentrated in the kiln dust in the dust filter after the raw mill. Since very little mercury leaves with the clinker or exits the stack when the raw mill is running, the concentration of mercury increases in the kiln feed, kiln dust, conditioning tower dust, raw mill cyclone dust, downcorner dust, downcorner gas stream, and gas streams in the mid to upper stages of the preheater tower to many times the levels found in the original raw materials.

This invention comprises a method and system for the continuous removal of mercury and alkali chlorides from an industrial plant utilizing cement or lime kiln or, in the case of a power plant, a coal fired boiler. One embodiment is to remove hot gas, ~1150° C., with a kiln gas bypass and cool it to a temperature below the boiling point of the alkali chloride compounds (~700° C.), but above the boiling point of the mercury compounds (~325° C.). The gas may be cooled with water, ambient air, another gas stream within the cement process that is cooler than ~700° C., or a heat exchanger. Cooling the gas to within the above temperature range will cause alkali chlorides to condense/solidify onto any entrained dust in the gas stream, while keeping mercury compounds in the gas phase. The cooled gas is thereafter passed through a first hot dust collector, that is, a dust collector having an inlet maintained above the boiling point of the mercury compounds. The collected dust from the kiln gas bypass is high in unhydrated lime and alkali chlorides, while being low in mercury. Some of the collected bypass dust can be recycled back to the kiln bypass. In a further embodiment of the invention, some of the collected dust can be hydrated by adding water, which improves its ability to absorb mercury, i.e. to act as a mercury sorbent. Therefore, the hydrated bypass dust can be used as a mercury sorbent to remove mercury by injecting it upstream in the process. Any remaining hydrated/unhydrated bypass dust can be disposed.

The exhaust gas exiting the first hot dust collector containing volatilized mercury is sent to a reaction area, which may simply be a duct or an optional reactor vessel. Mercury containing particulate material may also be also directed into this reaction area. The source of the particulate material can be kiln dust removed from the main kiln filter, raw mill cyclone dust, conditioning tower dust, kiln feed, raw material component(s) from a external source such as fly ash from a power plant, or any combination of the these sources. Within the reaction area the mercury containing particulate material is dispersed in the hot exhaust gas stream from the first hot dust collector. Additional hot gas may be added to the reaction area from a stage of the preheater, the downcorner, the calciner, the tertiary air duct, the kiln hood, the cooler vent duct, a mid cooler takeoff, a separate heater, or a any combination of these hot gas sources to ensure that the temperature in the reaction area is not below the proper temperature for desorption of the mercury and other contaminants from the particulate material. The conversion of mercury and the other contaminants into their gaseous phase generally occurs best within the range of from about 300° C. to about 900° C., more preferably 400° C. to about 600° C. and most preferably 450° C. to about 550° C. This heating step is directed to remove the mercury content from the particulate material. The residence time of particulate material in the hot gas needed to remove mercury from the particulate material will depend upon the temperature of the hot gas, the concentration of mercury on the particulate material, and the form of the mercury in the particulate material. Residence time of 0.1 to 3 seconds is generally sufficient for the purposes of this invention. Therefore, when the reaction area is a duct it has to be of sufficient length to provide for sufficient residence time, taking into consideration the velocity of the heated gas through the reaction area.

Chemical additives may be optionally added, either upstream, downstream, or in the reaction area, to assist in converting the mercury to the oxidized form to aid in the readsorption of mercury when the sorbent or chemical reagent is added downstream of the first dust collector. Suitable oxidizing agents include ozone, peroxide, halogenated species such as a chlorine solution, potassium permanganate, hydrochloric acid, iodine and other agents suitable to oxidize mercury.

The preferred amount of oxidizing agent, if employed, will typically be expressed as its concentration in the gas stream downstream from where the agent is injected. For example, when the oxidizing agent is chlorine the preferred concentration of chlorine in the gas stream will generally range from about 500 to about 10000 ppm. When determining the amount of oxidizing agent to employ consideration should be given on whether there are any naturally occurring oxidizing agents such or other halogens naturally occurring in the hot process gas utilized in the invention.

Gases and particulate material exiting the reaction area are maintained at a sufficient temperature to keep mercury in a vaporized form in the gas stream. The gases may be optionally treated with water or ambient air or cooled with a heat exchanger after exiting the reaction area in order to maintain optimal levels of vapor, and to control the temperature of the gas into a second dust collector, particularly when such second dust collector is a hot ESP. If so treated, the temperature of the gas stream should not fall below the temperature at which the mercury compounds will re-adsorb back onto the particulate material. When a hot ESP is employed as the second dust collector, the temperature of the gas entering the ESP will generally range from about 350° C. to about 500° C.

The clean particulate material is collected in the second, hot dust collector which is a hot ESP, a hot high efficiency cyclone, a high heat ceramic filter or other form of hot dust collector. The collected particulate material will be essentially mercury free so long as the second hot dust collector is maintained at a temperature above which mercury is reabsorbed. If the collected clean particulate material is predominantly fine cement raw material or an intermediate product found in a cement plant, then it can be returned to the production process as kiln feed after being metered through a bin or silo. Alternatively, the cleaned particulate material can be used it other ways. For example, cleaned fly ash can be used in industrial processes, such as in the production of cement clinker, as a major component in blended cements, in the manufacture of light weight aggregates, and as a replacement for sand in manufacturing controlled low strength materials.

After the particulate material is collected, the hot gas is optionally cooled downstream of the second dust collector, such as with injections of water or ambient air or a heat exchanger, to a temperature that improves the removal of mercury by a sorbent or chemical reagent. The hot gases are thereafter exposed to an interactive agent that interacts with the contaminants in the gases. The interactive agent is selected from the group consisting of (i) a sorbent material on which the contaminants are physically and/or chemically adsorbed and (ii) a chemical reagent which chemically reacts with the contaminants to thereby form a product from the agent/contaminant interaction and decrease the amount of contaminant in the gases. The interactive agent containing the contaminants is thereafter removed from the gas stream in a third dust collector.

For sorbents such as activated carbon or hydrated lime the temperature at which the hot gas is cooled is typically below about 200° C. and preferably below about 150° C. However, if a sorbent used is a high temperature sorbent such as MinPlus™, a trademark of MinPlus Inc. for a mineral based, non carbon sorbent designed to adsorb mercury at temperatures above 400° C., then the hot gas would not need to be cooled. The amount of sorbent (which may be hydrated bypass dust collected with the first hot dust collector or an added chemical reagent) will depend on factors such as the amount of mercury in the gas stream, the form of the mercury, the amount of particulate material (which may function as a relatively inefficient sorbent for mercury) remaining in the gas stream, the type of sorbent or chemical reagent employed, and the desired amount of collected mercury. However, assuming an efficient second, hot dust collector ($\geqq 99$ percent efficient in removing particulate material) is utilized, resulting in minor amounts of particulate material in the hot gas stream, then sorbents such as activated carbon will be typically added to the gas stream at the rate of about 1 lbs to about 20 pounds activated carbon per one million cubic feet of process gas. The mercury containing sorbents or chemical reagents and any remaining particulate material are then collected in a third collector, which, when activated carbon or hydrated lime are the sorbents will be a so-called "cold" collector having inlet temperatures typically ranging from about 100° C. to about 200° C., after which the cleaned gases are vented either through a separate stack or one or more other stacks at the cement plant. Alternatively, the cleaned gases may be vented through a raw material grinding mill, coal mill, main kiln filter, downcorner, or cooler vent system. Some of the collected sorbents or chemical reagents and any remaining particulate material may be re-circulated to the gas stream after it passes through the first dust collector to adsorb more mercury, while any sorbents or chemical reagents and remaining particulate material not re-circulated is transported to an appropriate disposal site or regenerated.

A gas suspension absorber, which is a form of semi-dry scrubber that utilizes a fluidized bed reactor, can optionally be used after the first dust collector to cool the gas, inject fresh sorbents or chemical reagents, recycled sorbent or chemical reagents and recycled particulate material. An FLSmidth Airtech Gas Suspension Absorber can suitably be used in such an application. The advantages of using a gas suspension absorber are that very little alkali chlorides are recycled to the cement process so the size of the kiln bypass can be minimized and the hydrated, bypass dust can be used as a sorbent to remove mercury which can eliminate sorbent cost.

The invention is explained in greater detail below with the aid of the drawings. FIG. 1 shows one embodiment of the application of the method according to the invention using a kiln installation for the production of cement clinker. The kiln installation consists in part of a cyclone preheater tower 16, a rotary kiln 18 and a clinker cooler 20. The cyclone preheater 16 comprises five cyclone stages, although less or more cyclone stages can be employed. Raw product from raw mill 13 is directed to the raw mill cyclone 12. The raw mill cyclone separates the finer fraction of raw meal from the coarser fraction. The coarser fraction can either be directed to reaction area 26 (FIG. 2) as the first step for treatment in contaminant removal area 100 (shown in detail in FIG. 2) to remove contaminants according to this invention or is directed to kiln feed storage/blending silo 14 via conduit 48. From silo 14 the feed can either be directed to reaction area 26 as the first step for treatment to remove contaminants or be introduced into cyclone preheater 16 via kiln feed inlet 44 and preheated in a counter-current arrangement with kiln exhaust gases. The preheated raw meal is separated from cyclone preheater 16 and directed to the calciner 17 in which it is calcined. Thereafter the calcined raw meal is directed to separation cyclone 51 from which it exits via bottom outlet 49. The calcined raw meal is then directed to rotary kiln 18 in which it is burned into cement clinker which is then cooled in clinker cooler 20. Following cooling, clinker 52 is directed to storage.

The exhaust gases from rotary kiln 18 and calciner 17 are directed up through cyclone preheater 16. Tertiary air from clinker cooler 20 is introduced via duct 19 into calciner 17. Hot gases from preheater tower 16 enter an optional gas conditioning tower (GCT) 15 via downcorner 34. Gases entering the GCT from may be as hot as 400° C. Nozzle means 31 located within and near the entrance of GCT 15 injects a spray of cooling liquid into the hot gas flow. Gases exiting GCT 15 can be sent to mill 13 to help dry the ground feed. However, when the raw feed mill 13 is not in operation, gases can flow directly from GCT 15 to main kiln filter 11. Kiln dust exiting GCT 15 via conduit 47 can either be directed to reaction area 26 as the first step to remove contaminants according to this invention or directed to silo 14.

Gases and the finer fraction of the raw product from the raw mill exiting cyclone 12 via conduit 50 are directed to main kiln filter 11. Separated dust from main kiln filter 11 via conduit 46 is either collected for treatment according to this invention in reaction area 26 or directed to feed blending/ storage silo 14 and the cleaned gas is directed to exhaust.

Figure 2:
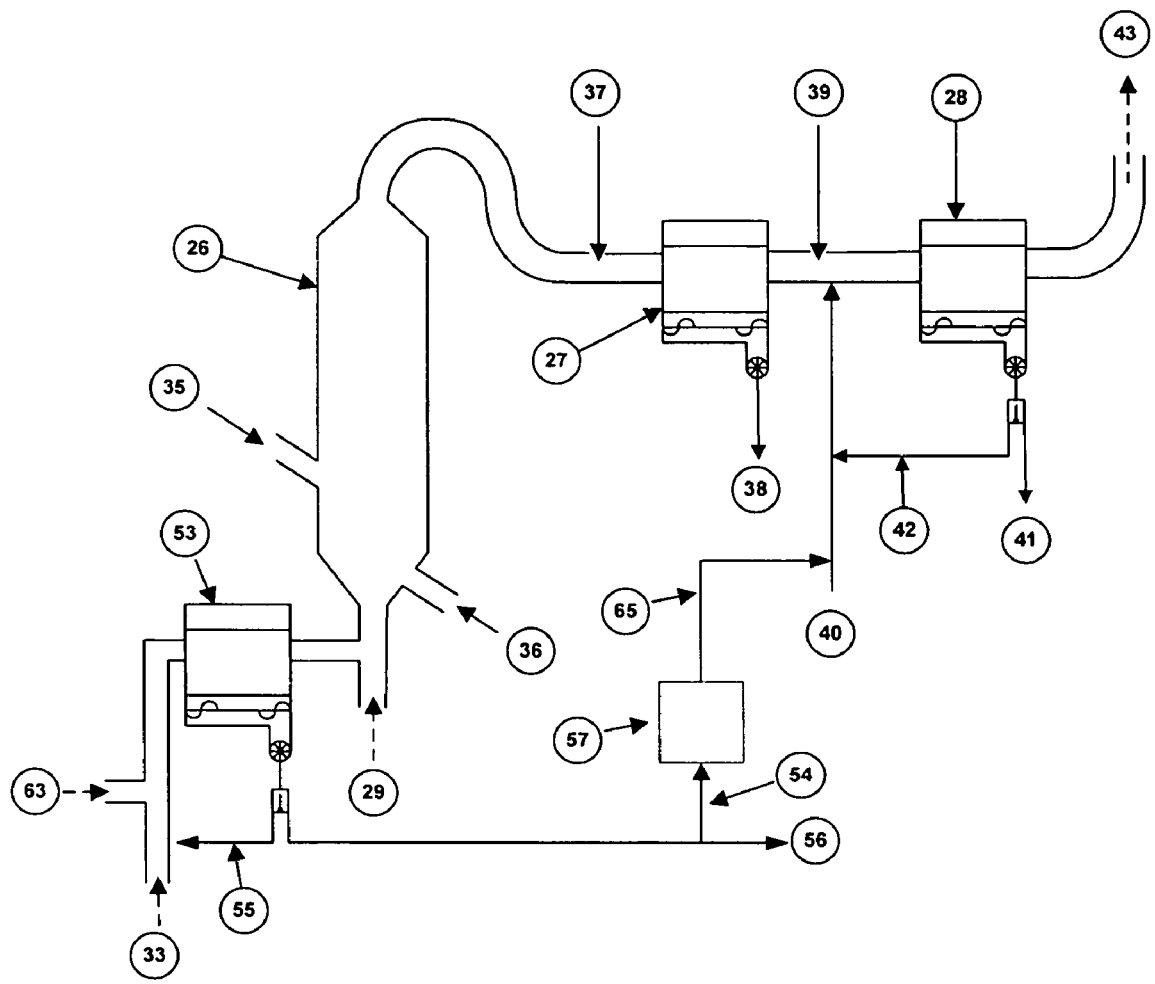
FIG. 2 shows an enlarged partial diagram of the contaminant removal/cleansing zone 100 portion of FIG. 1, which is the first embodiment of the present invention.
Figure 3:
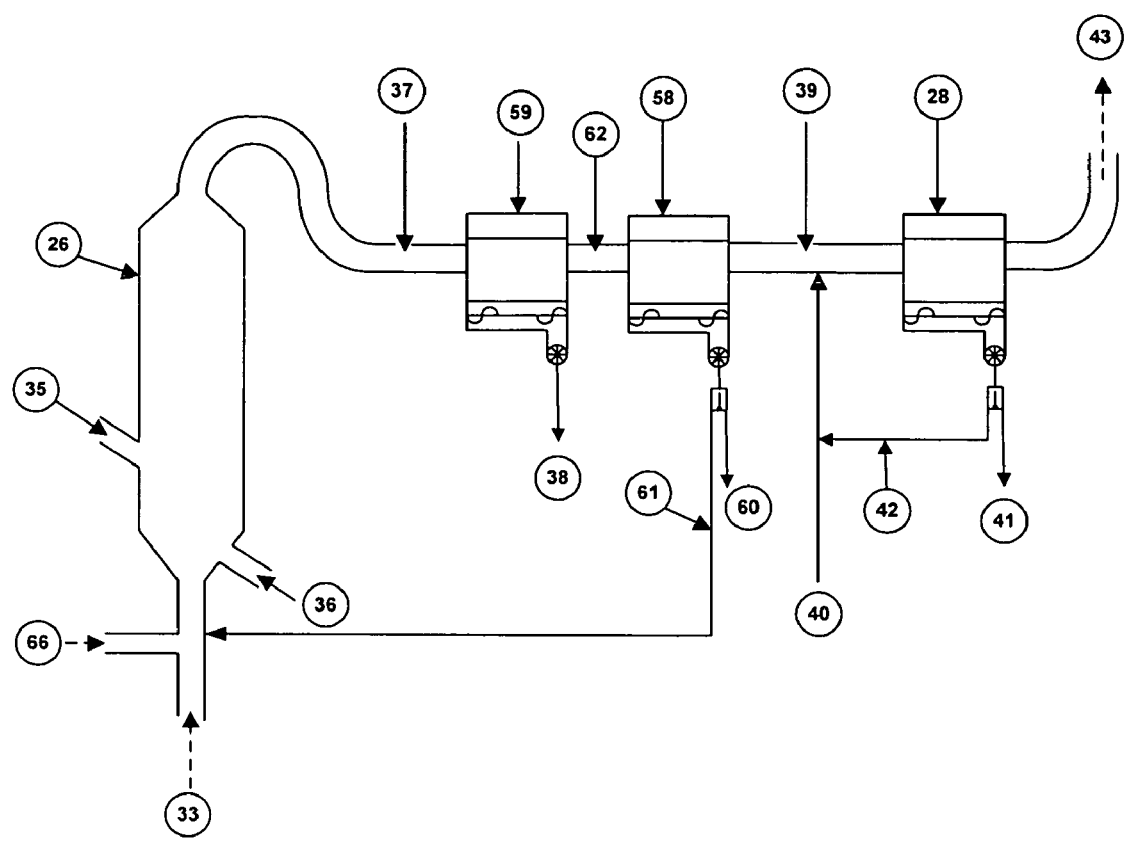
FIG. 3 is an enlarged partial diagram of a second embodiment of the present invention.

Contaminant removal area 100 is depicted in more detail in FIG. 2 and the alternate embodiment of FIG. 3. FIG. 2 shows one embodiment of the invention using a hot dust filter upstream of the reaction area 26. Hot gas having entrained particulates from the kiln bypass 33 contains a high concentration of alkali chlorides and also mercury contaminants is cooled by stream 63 to a temperature below the boiling point of alkali chlorides but above the boiling point of mercury compounds to condense the alkali chlorides onto the particulates while keeping the mercury compounds in the gas phase. Stream 63 can be either water, ambient air, or off gas from a variety of locations in a plant as long are they are below the boiling point of alkali chlorides. These include, but are not limited to, middle to upper stages of the preheater tower 16, cooler vent duct 22, cooler vent heat exchanger exit duct 64, cooler vent dust collector exit duct 25, downcorner 34, main stack 10, or other gas sources or combinations of sources cooler than the boiling point of alkali chlorides.

The gas having entrained particulates with alkali chlorides condensed thereon is directed to the first hot dust collector 53 having an inlet above the boiling point of mercury. Dust collected in the first hot dust collector 53 will have a high alkali chloride and unhydrated lime content and a low mercury content. This dust can be recycled via conduit 55, disposed via conduit 56, or sent to a hydration device 57 via conduit 54. Hydrating the bypass dust increases its ability to absorb mercury and be used as a mercury sorbent. The hydrated bypass dust is thereafter directed into inlet 40 from where it is inserted downstream in the process.

The gas stream exiting the first hot dust collector 53 is directed to reaction area 26. Reaction area 26 as depicted is a duct or vessel with a larger cross-sectional area than the rest of the ductwork to reduce the gas velocity to achieve a relatively longer residence time than if it were sized comparable to the other ductwork in contaminant removal area 100. Reaction area 26 can alternatively be other sizes depending on the desired residence time. For example, a relatively longer duct of the same or smaller cross-sectional area as the rest of the ductwork can be employed.

A mercury-containing particulate material is fed into material inlet 35 of reaction area 26. Typically the particulate material will be a mercury containing dust. In a cement plant the particulate material inserted into reaction area 26 is generated from some or all of kiln filter 11, GCT 15, coarser fraction from raw mill cyclone 12, raw material 30, kiln feed 44 or 45, external sources such as fly ash from a power plant or a combination of these streams and can be collected and directed to reaction area 26 in any manner known in the art. The mercury containing particulate material is mixed in reaction area 26 with gas from the first hot dust collector 53 (which may contain therein some volatilized mercury) and optionally with hot gas entering via gas inlet 29, which can be located upstream from or in reaction area 26. The source of the hot gas for the hot gas inlet 29 can be from a variety of locations in a plant as long as they have a gas temperature above the boiling point of mercury compounds or contain volatilized mercury. These include, but are not limited to, preheater tower 16, calciner 17, tertiary air duct 19, kiln hood 21, cooler vent duct 22, kiln gas bypass duct 33, downcorner 34, or other hot gas sources or combinations of sources. A separate heating system may also be provided for auxiliary heat or for all the heat requirements for the system. Optionally, oxidizing agents to assist in making mercury easier to capture can be added to the hot gas reaction area 26 such as via inlet 36 which can be located upstream, downstream, or in reaction area 26.

The mercury is volatilized off of the particulate material in reaction area 26. Hot gas containing volatile contaminants and cleaned particulate material is directed to second hot dust collector 27. Optional quenching air or water can be added to the hot gas, such as via inlet 37 or the hot gas can be cooled with a heat exchanger. The cleaned particulate material 38 is returned to the plant to be used as kiln feed-either to the kiln silo 14 or combined with the kiln feed in conduit 44. Alternatively, the cleaned particulate material can be used for other purposes. The hot gas stream containing volatilized mercury and other contaminants then is directed to the third cold dust collector 28. Prior to entering, or while in, the third collector 28, the contaminants are physically and/or chemically adsorbed onto a sorbent or chemically react with a chemical reagent, with both the sorbent and chemical reagent having been injected into the gas stream. Optionally, the hot gas can be subject to cooling downstream from second dust collector 27, such as through the use of an optional heat exchanger or the addition of quenching air or water, such as via inlet 39, to thereby drop the temperature of the hot gas to a level that increases the amount of mercury removed by the sorbent or chemical reagent. An agent that interacts with the mercury in the gas stream such as sorbents and/or chemical reagents can be added to the gas stream via inlet 40 to thereby form a product of the agent/mercury interaction, with the formation of said product concurrently removing mercury from the gas stream. However, if a sorbent or chemical reagent is used that can remove mercury effectively without cooling, such as MinPlus™ sorbent, then the gas may not have to be cooled after the first dust collector.

The sorbents or chemical reagents remove mercury, mercury compounds or high molecular weight organic compounds from the gas stream. The reactivity and amount of sorbent or chemical reagent used in the present invention can be controlled by the type of sorbent or chemical reagent utilized, where the sorbent or chemical reagent is inserted in or near the third collector and/or the temperature profile of (i) the gas in the area in which the sorbent or chemical reagent is injected and (ii) the third collector. Generally, the earlier the sorbent or chemical reagent is provided before the third collector, the longer the gas contact time and hence the greater the removal potential. However, the removal of a contaminant may have a temperature window where removal is favored. In the case of mercury and mercury compounds using activated carbon or hydrated lime, adsorption will generally occur in the temperature window of about 20° C. to about 300° C., preferably about 80° C. to about 200° C. Providing the activated carbon or hydrated lime in an area in which the temperature is above this window, even though providing a longer contact time, will not necessarily increase the adsorption efficiency. The sorbent or chemical reagent or dust particle (as described below) containing contaminant can be disposed via conduit 41, recycled via conduit 42, or regenerated. Alternatively, some or the entire spent sorbent/chemical reagent can be added to the clinker/cement if the captured mercury is in a form that passes environmental regulations and the clinker/cement passes quality standards.

In addition, depending upon the properties (size, shape, quantity and composition) of any particulate matter still in the system downstream from dust collector 27, the mercury contaminants may absorb on to such dust particles which may then be recirculated back into the system via conduit 42.

The cleaned gas can be vented via conduit 43 to a separate stack (not shown) or returned to the cement plant.

FIG. 3 shows a second embodiment of the present invention which may be utilized depending on the specifications or layout of the particular plant in which the invention is being applied. The embodiment of FIG. 3 is similar to the embodiment of FIG. 2 with the reaction area 26, dust collector 28, inlets 33, 35, 26, 39, 40, streams 41, 42, and 43 acting/functioning the same as described in the first embodiment shown in FIG. 2. The differences between the embodiments are described below.

Either two hot dust collectors 58 and 59 or a multi-stage hot dust collector (not shown) are located downstream of reaction area 26. The kiln bypass gas 33 may be mixed with stream 66 which can come from the same locations in a plant as stream 66 as long as the temperature exiting reaction area 26 remains above the boiling point of the mercury compounds and below the boiling point of the alkali chlorides. Stream 66 may be used to partially cool the kiln bypass gas 33 for operational reasons, such as to prevent fouling. Stream 66 may also add heat energy or mercury compounds to the kiln bypass gas 33 and therefore can comprise of off gases from, for example, preheater tower 16, calciner 17, tertiary air duct 19, kiln hood 21, cooler vent duct 22, kiln gas bypass duct 33, downcorner 34, or other hot gas sources or combinations of sources. A separate heating system may also be provided for auxiliary heat or for all the heat requirements for the system.

Optional quenching air or water can be added to the hot gas exiting reaction area 26, such as via inlets 37 or 62, or the hot gas can be cooled with a heat exchanger. The gas exiting reaction area 26 contains volatilized contaminants such as mercury along with bypass dust and dust from inlet 35. In addition, any dust in quenching gas stream entering the system via inlet 37 will have a low mercury content since the temperature is above the boiling point of the mercury compounds.

All the dust in the system upstream from hot collector 59 will collect alkali chlorides since the gas temperature is below the boiling point of the alkali chlorides. The gas stream containing alkali chloride dust is directed to the first hot dust collector 59 (or the first stage of a multi-stage hot dust collector) which collects the coarser particles and remove them via outlet 38, while the second hot dust collector 48 (or the last stage of a multi-stage hot dust collector) collect the finer particles which are disposed of via outlet 60 and/or recirculated via outlet 61.

Some examples of multi-stage hot dust collectors which may be utilized in the present invention are (1) a multi-field EP Hybrid; (2) a EP/high temperature fabric bag house; (3) a hybrid EP/ceramic filter; or (4) a hybrid EP/stainless steel bag house. Alternatively, when there are two hot dust collectors in series, the first hot dust collector can be a regular or low efficiency cyclone, EP, settling chamber, or other mechanical dust collector. The second dust collector can be a high efficiency cyclone, EP, high temperature fabric bag house, stainless steel dust collector, or ceramic filter.

The coarse particles exiting via outlet 38, have a relatively low mercury content. They also have a lower alkali chloride content, as a percentage of product mass, than the finer particles removed in second dust collector 58 (or in the second stage of a multi-stage dust collector). These coarse particulates are returned to the plant to be used as kiln feed-either to the kiln silo 14 or combined with the kiln feed in conduit 44. Alternatively, the cleaned particulate material can be used for other purposes. The fine particles exiting via 60 and/or 61 will have relatively high alkali chloride concentration. In final dust collector 28 the mercury will be removed in a similar manner as described for FIG. 2. The gas stream exiting the last stage via outlet 43 is likewise treated the same as in the embodiment depicted in FIG. 2.

Using this invention the average alkali chloride concentration in the kiln, preheater, and clinker is reduced and the average amount of mercury emitted from a cement plant is significantly reduced. If the additional mercury reduction is necessary, then the following modifications to the cement plant process can be implemented to further decrease the mercury emissions:

(a) Injecting a sorbent or chemical reagent upstream of the main filter 11, particularly when the raw mill is down. The sorbent or chemical reagent containing mercury would be captured by the main filter 11 and then sent to the contaminant removal area 100.

(b) Redirecting some or all of the gas exiting the main filter 11 in conduit 10, particularly when the raw mill is down, to upstream of location 40 where the sorbent or chemical reagent is added in contaminant removal area 100.

(c) A combination of these two methods.

The invention having been thus described it will be obvious that the same may be varied in many ways without departing from the spirit and scope thereof. All such modifications are intended to be included within the scope of the invention which is defined by the following claims.

We claim:

1. A method of removing alkali chlorides and mercury contaminants from a gas stream generated by an industrial process that contains entrained dust, said method comprising
   (a) bringing the gas stream to a temperature below the boiling point of the alkali chlorides but above the boiling point of the mercury contaminants to thereby condense alkali chlorides on the entrained dust;
   (b) removing the entrained dust containing alkali chlorides from the gas stream;
   (c) inserting particulate material having mercury contaminants into the gas stream;
   (d) maintaining the gas stream at a temperature above the temperature at which said mercury contaminants vaporize to thereby vaporize the contaminants from the particulates while entraining the cleaned particulates in the gas stream;
   (e) removing the cleaned particulates from the gas stream;
   (f) absorbing the mercury contaminates in the gas stream on a sorbent in the gas stream; and
   (g) recovering the sorbent from the gas stream.

2. The method of claim 1 further comprising hydrating the entrained dust containing alkali chlorides that have been removed from the gas stream and inserting said hydrated dust into the gas stream to act as a sorbent for the vaporized mercury contaminates.

3. The method of claim 1 wherein the contaminants absorb on particulate material remaining in the gas stream following step (e).

4. The method of claim 1 wherein the recovered sorbent is recycled back into the gas stream to be reused as a sorbent.

5. The method of claim 1 wherein the sorbent is added to the gas stream following step (e).

6. The method of claim 1 wherein the gas stream comprises of off gases from a cement kiln.

7. The method of claim 6 wherein the particulate material comprises kiln dust.

8. The method of claim 1 wherein the gas stream comprises off gases from a lime kiln.

9. The method of claim 1 wherein the gas stream comprises of off gases from a power plant boiler.

10. The method of claim 9 wherein the particulate material comprises fly ash.

11. A method of removing alkali chlorides and volatile contaminants, said volatile contaminants having boiling points below the boiling point of the alkali chlorides, from a industrial process generated gas stream that also contains entrained dust, said method comprising
    (a) bringing the gas stream to a temperature below the boiling point of the alkali chlorides but above the boiling point of the volatile contaminants to thereby condense alkali chlorides on the entrained dust;
    (b) removing at least some of the entrained dust containing alkali chlorides from the gas stream;
    (c) interacting the volatile contaminants with an agent that is in the gas stream to form a contaminate containing particulate that is entrained in the gas stream; and
    (d) separating the particulate from the gas stream.

12. The method of claim 11 wherein the volatile contaminants comprise mercury containing compounds.

13. The method of claim 12 wherein the agent comprises dust remaining in the gas stream following step (b) that functions as a sorbent on which the contaminants absorb.

14. The method of claim 11 wherein the agent comprises a sorbent material on which the contaminants are physically and/or chemically adsorbed.

15. The method of claim 14 wherein the recovered particulate is recycled back into the gas stream to be reused as a sorbent.

16. The method of claim 14 wherein the sorbent is added to the gas stream following step (b).

17. The method of claim 11 wherein the agent comprises a chemical reagent which chemically reacts with the contaminants to thereby form a product from the agent/contaminant interaction.

18. The method of claim 11 further comprising, prior to step (b) inserting particulate material having mercury contaminants into the gas stream, with said mercury contaminates being vaporized from said particulate materials.

19. The method of claim 18 wherein the particulate material is kiln dust.

20. The method of claim 18 wherein the particulate material is fly ash.

* * * * *